US012617721B2

(12) United States Patent
Guo et al.

(10) Patent No.: US 12,617,721 B2
(45) Date of Patent: May 5, 2026

(54) METHOD FOR PREPARING CEMENTING MATERIAL BY SINTERING ACTIVATION OF COAL GANGUE

(71) Applicant: CENTRAL SOUTH UNIVERSITY, Changsha (CN)

(72) Inventors: Zhengqi Guo, Changsha (CN); Jian Pan, Changsha (CN); Deqing Zhu, Changsha (CN); Congcong Yang, Changsha (CN); Siwei Li, Changsha (CN); Qihou Li, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 329 days.

(21) Appl. No.: 18/240,372

(22) Filed: Aug. 31, 2023

(65) Prior Publication Data

US 2024/0067564 A1     Feb. 29, 2024

(51) Int. Cl.
| | |
|---|---|
| *C04B 18/12* | (2006.01) |
| *C04B 11/26* | (2006.01) |
| *C04B 20/02* | (2006.01) |
| *C04B 20/04* | (2006.01) |
| *C04B 28/12* | (2006.01) |
| *C04B 28/14* | (2006.01) |

(52) U.S. Cl.
CPC .............. *C04B 18/12* (2013.01); *C04B 11/26* (2013.01); *C04B 20/026* (2013.01); *C04B 20/04* (2013.01); *C04B 28/12* (2013.01); *C04B 28/14* (2013.01)

(58) Field of Classification Search
CPC ....... C04B 18/12; C04B 11/26; C04B 20/026; C04B 20/04; C04B 28/12; C04B 28/14; C04B 28/021; C04B 7/243; C04B 7/421; Y02P 40/10
See application file for complete search history.

(56) References Cited

FOREIGN PATENT DOCUMENTS

| | | | | | |
|---|---|---|---|---|---|
| CN | 1236748 | A | 12/1999 | | |
| CN | 106966620 | A | 7/2017 | | |
| CN | 109956737 | A | 7/2019 | | |
| CN | 110078401 | B | 2/2020 | | |
| CN | 112794726 | A * | 5/2021 | .......... | C04B 38/009 |
| CN | 113526883 | A | 10/2021 | | |
| CN | 113526895 | B | 4/2022 | | |

\* cited by examiner

*Primary Examiner* — Anthony J Green
(74) *Attorney, Agent, or Firm* — Addison D. Ault; IPGentleman Intellectual Property Services, LLC

(57) ABSTRACT

A method for preparing a cementing material by sintering and activating coal gangue is provided. The method includes the following steps: (1) crushing coarse-grained coal gangue to predetermined particle size; (2) fully and evenly mixing the crushed coal gangue, the composite additive and water according to a set proportion, and granulating the obtained mixture; (3) distributing, igniting and exhausting the granulated pellets in the sintering machine to obtain decarburized coal gangue sinter; (4) cooling the decarburized coal gangue sinter in a cooler; (5) crushing and finely grinding the cooled coal gangue sinter to obtain a coal gangue active mixture; and (6) mixing the coal gangue active admixture, the fly ash, the quicklime and the gypsum according to a predetermined ratio, and then carrying out injection moulding, mold removal and curing to obtain the coal gangue-based cementitious material.

10 Claims, 2 Drawing Sheets

Receiving system

Cooling system

Discharge system

Dead material layer

1

METHOD FOR PREPARING CEMENTING MATERIAL BY SINTERING ACTIVATION OF COAL GANGUE

CROSS REFERENCE TO THE RELATED APPLICATIONS

This application is based upon and claims priority to Chinese Patent Application No. 202211054213.3, filed on Aug. 31, 2022, the entire contents of which are incorporated herein by reference.

TECHNICAL FIELD

The present disclosure relates to the field of comprehensive utilization of solid waste, in particular to the method for preparing cementing material by sintering activation of coal gangue.

BACKGROUND

Coal gangue is a type of solid waste created during the mining, washing, processing, and usage of coal. Its main components are $Al_2O_3$, $SiO_2$, etc. in the form of minerals such as kaolinite and quartz. China's coal resources are very abundant, and the energy structure is mainly coal. The yield of coal gangue is about 5%-20% of coal mining, so the output of coal gangue is particularly high. More than 8 billion tons of coal gangue have been accumulated in China, covering an area of more than 110,000 hectares, with more than 1,100 coal gangue storage mountains, and coal gangue emissions are still growing rapidly. Since the main components of coal gangue are $SiO_2$ and $Al_2O_3$, it is similar to building materials. Therefore, one of the important ways to attain widespread consumption and application of coal gangue is to figure out how to use it as a building material (such as cementitious material). If coal gangue is used to prepare building materials such as cement admixture, appropriate methods must be used to increase its activity and reduce organic matter in coal gangue, such as residual carbon. An important technique for decarburizing and activating coal gangue is high-temperature thermochemical activation, which primarily uses the roasting and sintering methods of rotary kilns.

The Chinese patent CN1236748A releases a process for calcining coal gangue to create activated cement mixture. The method uses a straightforward kiln, an oxidation atmosphere, and calcination temperatures controlled between 850 and 1150° C. to prepare coal gangue into activated cement mixture. However, despite the process is simple, the rotary kiln has a number of issues, including its circumference, high energy consumption, and difficulty controlling environmental pollution.

The Chinese patent CN110078401B discloses a process for producing active mixed materials by band-type sintering of coal gangue. The Chinese patent CN113526883A discloses a coal-free self-heating ultra-high material layer decarbonization process. The Chinese patent CN113526895B discloses a method for coal gangue double-layer oxygen-enriched sintering and decarburization. All of these techniques use the sintering process to roast, decarburize, and activate the coal gangue to increase its activity.

Among the disclosed techniques for preparing active mixtures from coal gangue that active mixtures can be made by separating, such as belt sintering and rotary kiln calcination. However, the two processes are calcined and decarburized, and the sintering utilization coefficient is not great, with the highest being only 1.48 t/(m²h), and the activity index of the combination is less than 90°/%, limiting its further application.

Among the prior art is the Chinese patent CN106966620A, which discloses a cementitious material made of coal gangue bottom slag, fly ash, and a method of preparing it. The components of the cementitious material have the following weight percentage contents: coal gangue bottom slag 10-35%, fly ash 25-55%, quicklime 5-50%, gypsum 8-12%. Coal gangue bottom slag is the byproduct of coal gangue combustion in coal gangue power plants after 800-1000° C. Due to the low activity of coal gangue bottom slag, the maximum addition ratio is only 35%, making it impossible to use in cementitious materials with high proportions and big scales.

SUMMARY

Aiming at the technical problem of "coal gangue has poor activity effect and low sintering utilization coefficient, so it cannot be applied to cementitious materials in a high proportion" in the previous art. The goal of this prevent invention is to provide the method for preparing cementing material by sintering activation of coal gangue to improve the activity of coal gangue mixture and its proportion in cementitious materials, allowing coal gangue to be used on a large scale and for a high value.

The objective of the present disclosure is achieved by using the following technical solution:

The method for preparing cementing material by sintering activation of coal gangue, wherein it includes the following steps:

(1) Pretreatment: Coarse-grained coal gangue is crushed to a predetermined particle size;

(2) Ingredients, mixing and granulation: The crushed coal gangue, composite additive, and water obtained in step (1) are fully mixed according to the predetermined ratio, and the resulting mixture is then granulated to obtain granulation pellets;

(3) Sintering activation: The pellets obtained in step (2) are distributed, ignited, exhausted and sintered in the sintering machine to obtain the decarburized coal gangue sintered material;

(4) Cooling: The decarburized coal gangue sintered material obtained in step (3) is cooled in a cooling machine;

(5) Crushing and grinding: The cooled coal gangue sintered material obtained in step (4) is crushed and finely ground to obtain the coal gangue active mixture;

(6) Compound: The coal gangue active mixture, fly ash, quicklime and gypsum obtained in step (5) are mixed in accordance with the predetermined proportion, and then injection molding, mold removal and curing are carried out to obtain coal gangue-based cementitious materials.

Preferably, the fixed carbon content of the coal gangue in step 1 should range from 1.5% to 5.5%.

If the fixed carbon concentration is too low, it is necessary to add solid fuels, including coal or coke powder, which raises the cost; If the fixed carbon concentration is too high, the residual carbon composition in the sintered material is high and the burning loss is large, resulting in low coal gangue sintered material activity and poor cementitious material strength.

Preferably, the coal gangue is pretreated by a jaw crusher-counter roll crusher-high-pressure roller mill in step 1.

Further, a jaw crusher reduces the coal gangue to −15 mm, and then a roller crusher reduces it to 8 mm; Following that, high-pressure roller grinding is used to crush the particle size 6.3 mm, which accounts for 65%-85%, and –0.5 mm, which accounts for 15%-25%.

Further, the working pressure of the high-pressure roller grinding and crushing operation is 2.0-6.0 MPa in step (1).

High-pressure roller grinding and crushing is particularly crucial in step 1. The use of high-pressure roller milling instead of the traditional crushing and grinding process can not only save more than 30% of energy consumption, but also the use of isostatic crushing by high-pressure roller milling can form cracks between coal gangue particles, allowing oxygen to pass through and ensuring that the carbon and oxygen in the coal gangue fully contact and react. This improves the kinetics of the reaction, which in turn encourages combustion and activity.

Furthermore, the working pressure of high-pressure roller grinding is 3.0-6.0 MPa.

Preferably, the powerful mixer is used for mixing, which the speed of the mixing is 1200-2200 rpm, the mixing time is 36 minutes, and the mixing moisture is 5%-6% in step 2.

Preferably, the amount of composite additive added in step (2) is 0.5%-1.5%. The composite additive contains manganese dioxide, potassium perchlorate and sodium humate, and the mass percentages are 10%-30%, 30%-50% and 20%-60%, respectively.

The present invention provides a multifunctional composite additive that can be used to improve granulation, catalytic combustion and enhance activity etc. The ratio and dosage of composite additives are critical for improving the sintering performance of coal gangue.

In composite additives, the synergy of manganese dioxide, potassium perchlorate, sodium humate, and coal gangue had a substantial effect on the ring sintering performance of coal gangue. Sodium humate is a network organic polymer with carboxyl and hydroxyl groups that creates a network structure with silica-aluminum minerals in coal gangue, produces chemical adsorption, and binds fine coal gangue particles into coarse particles, thereby improving its air permeability. Potassium perchlorate is a powerful oxidant that decomposes easily and releases oxygen at high temperatures, hence increasing the concentration of oxygen in the sintered material layer and efficiently promoting the entire combustion of oxygen and fixed carbon in coal gangue. Manganese dioxide is a carbonaceous fuel catalyst that can significantly improve oxygen transfer, stimulating the burning of fixed carbon in coal gangue and enhancing combustion efficiency. Furthermore, the fissures generated by the coal gangue pretreatment with high-pressure roller milling in step (1) facilitate the penetration and diffusion of the composite additive in step (2), allowing it to fully touch the fixed carbon in coal gangue and boost the effect of catalytic combustion. A significant number of studies are used to identify the proportion of each component in the additive and the amount of additive in coal gangue that in order to meet the ideal reaction kinetic conditions of the system in the process and produce the best technical and economic indicators.

Preferably, the cylinder granulator is utilized for granulation in step (2); the cylinder granulator's speed is 30-60 rpm, and the granulation period is 24 min. During the granulation process, the spraying water is 1%-2%, and the water content of the obtained granulation pellets is controlled at 6.5%-7.5%.

The air permeability resistance of the final raw meal should be less than 45 mm $H_2O$ after adequate adjustment of the aforesaid parameters.

Preferably, the sintering method described in step (3) includes any of the belt sintering, ring sintering, and step sintering.

Furthermore, the sintering method described in step (3) is belt sintering. In comparison to ring and step sintering, belt sintering offers a higher processing capacity, higher output, and a higher degree of automation, and it can process coal gangue on a large scale. The belt sintering machine can be 600 $m^2$ in size, with an annual processing capacity of more than 6 million tons.

Furthermore, the height of the material layer is adjusted to be 500-2000 mm during the fabric distribution process of belt sintering. The material layer's height is too low, the sintering heat storage is insufficient, and a particular amount of solid fuel is necessary to ensure sintering completion. Otherwise, if the material layer is greater than 2000 mm in thickness, the resistance of the material layer is too great, the negative pressure required for sintering is high, the sintering speed is slow, and the utilization coefficient is low;

The thickness of paving material is limited to 1525 mm, and it is made of coal gangue with a particle size of 1520 mm.

Furthermore, the ignition time of the belt sintering ignition process is 1-2 min, the ignition temperature is 1050-1150° C., the ignition negative pressure is 4-6 kPa, the insulation temperature is 700-1000° C., the holding time is 3-5 min, and the negative pressure of insulation is 4-6 kPa; The negative pressure of sintering in the belt exhaust sintering process is 10-18 kPa.

Preferably, the coal gangue sinter cooling method, including any of the belt sintering machine cooling, annular cooling, and shaft furnace cooling, is used in step (4).

Furthermore, the cooling process adopts a shaft furnace cooling device in step 4. The shaft furnace cooling medium moves from bottom to top, while the hot coal gangue sintered material to be cooled moves from top to bottom. Convection between the shaft furnace cooling medium and the hot coal gangue is employed to exchange enough heat, which effectively reduces the temperature of the sintered material. Simultaneously, shaft furnace cooling overcomes the technical difficulties of high air leakage rate, high fan consumption and slow cooling speed in common on-board cooling or ring cooling machines.

Furthermore, the shaft furnace cooling device comprises a shaft furnace body. The shaft furnace cooling device also includes a receiving system, a cooling system and a discharge system set sequentially from top to bottom; The shaft furnace cooling device also has a receiving system, a cooling system, and a discharge system that are installed in a top-to-bottom order.

The receiving system comprises a storage tank, a vibrating feeder.

The storage tank is located above the vibrating feeder for feeding from the upper portion of the vibrating feeder, and the bottom end of the vibrating feeder is equipped with a material chute; The head end of the chute is connected to the storage tank, while the tail end is attached to the shaft furnace body;

The end of the material chute is provided with a baffle, and the height of the baffle is 3-8 cm.

On the one hand, placing a baffle to generate a dead material layer above the chute avoids the thermal shock of the hot sintered material from the storage tank. On the other hand, the friction between the sintered material and the dead material layer on the trough will generate mechanical loss and reduce the aging damage of the equipment. If the baffle height reaches 8 cm, the unloading is hampered and not smooth. If the baffle height is less than 3 cm, a stable dead material layer with a certain thickness cannot be formed, which has a poor protective effect.

More preferably, the cooling system adopts a graded gradual cooling method, the cooling system includes a primary cooling unit and a secondary cooling unit from top to bottom;

The primary cooling unit includes two sets of central air caps, the central air caps are arranged up and down along the height direction, and each group of central air caps is provided with an air outlet;

The primary cooling unit further comprises two fans, which are symmetrically disposed on both sides of the shaft furnace body. Each fan is connected to three cold air pipes, and an inlet regulating valve is set at the connection between the fan and the three cold air pipes;

Wherein two cold air pipes are linked to the two sets of central air caps. Another cold air pipe is provided on the side of the shaft furnace body, and the side of the shaft furnace body is provided with a corresponding air outlet;

The secondary cooling unit's structure is consistent with the primary cooling unit's structure.

The first-stage cooling unit's air supply system is a dry cooling blower with an air volume of 3000-3500 m³/t, and the first stage of cooling of the incoming coal gangue sintered material is performed, which is swiftly chilled and produces a high-temperature exhaust gas; The secondary cooling unit's air supply system is a normal temperature blower with an air capacity of 1500-2000 m³/t that performs secondary cooling on the entering coal gangue sintered material to produce low-temperature waste gas.

The first section of the shaft furnace cooling device is swiftly cooled by a dry cooler, which may efficiently store heat energy in the hot sintered material in the glass phase formed after rapid cooling and improve its activity. Simultaneously, rapid cooling at high temperatures can cause strong temperature-shrinkage stress inside and on the surface of sintered material particles, increasing micro-cracks, reducing sintered material strength, improving grindability, and lowering the cost of subsequent fine grinding to prepare mixed materials. Furthermore, high temperatures and rapid cooling can result in a higher temperature hot exhaust gas, which promotes waste heat recovery and use while lowering overall process energy consumption. Following high temperature and rapid cooling, the second stage uses normal temperature cooling to avoid the ongoing use of high air volume and low air temperature cooling, which can effectively minimize the cooling process's energy consumption.

More preferably, an inverted cone is provided for the collection and cooling of coal gangue sintered material between the central air caps and the shaft furnace body. The central air cap is fixed mounted on the cold air pipe.

More preferably, the discharging system includes a disc discharger, which is located at the bottom of the shaft furnace body. The cooled coal gangue sintered material is discharged by a disc discharger and transported to the next process by belt.

More preferably, the shaft furnace body is cylindrical at the bottom and conical at the top. Steel plate is used to weld the shell of the furnace body, and refractory material is used to line the furnace body;

The upper half of the shaft furnace body is equipped with an exhaust vent, which is linked to the dust collection through a pipeline.

Preferably, the coal gangue sintered material is crushed to −3 mm using a toothed roller crusher in step (5). Then, the high-pressure roller mill and ball mill are combined to increase the specific surface area of coal gangue sintered material to 500-700 m²/kg, and the coal gangue active mixed material with set fineness and specific surface area is obtained.

A high-pressure roller mill is used in step (5). When compared to traditional crushing procedures, the high-pressure roller mill uses quasi-static pressure crushing, which saves around 30% of energy usage. In addition, the high-pressure roller mill implements material layer crushing on materials, which is mutual crushing between materials. The mechanical activation of the high-pressure roller mill can convert part of the mechanical energy into free energy. By destroying the structure of coal gangue silica-aluminum mineral, a large number of lattice defects formed by internal fracture significantly increase the specific surface area and greatly improve the activity of coal gangue sintered material.

Preferably, the raw material of the cementitious material, coal gangue active mixture, fly ash, quicklime, and gypsum are added in step (6), the mass percentages are respectively 55%-75%, 10%-20%, 10%-20% % and 5%-20%.

Furthermore, the CaO content of the quicklime hits 80% wt. % in step (6).

The CaO content in the fly ash is 30 wt. %-35 wt. %, $SiO_2$ content is 30 wt. %-40 wt. %, $Al_2O_3$ content is 20 wt. %-25 wt. %, MgO content is 3 wt. %-8 wt. %;

The $CaSO_4$ content in the gypsum exceeds 90 wt. %.

Preferably, in step (6), the stirring speed of mixing process is 250~300 rpm, and stirring time is 2-4 min. Three layers are transferred to the mold after the mixing is finished, with each layer vibrating for 40 seconds. Put PVC film over the specimen and take the mold off after 24 hours. Then transport to the curing box, which has a temperature of 1530° C. and a humidity of 92%-98%. Finally, the cementitious material was obtained, and the compressive strength test was performed for 3 days, 7 days, and 14 h.

In comparison to the prior art, the current invention exhibits the following technical advantages:

(1) The invention provides the method for preparing cementing material by sintering activation of coal gangue. Coal gangue is processed using belt sintering and a shaft furnace segmented cooler with a high processing capacity and difference, which reduces its carbon content, enhances activity, and improves the performance of coal gangue-based cementitious materials.

(2) The invention provides the method for preparing cementing material by sintering activation of coal gangue. The notion of cascade cooling of shaft furnace was originally proposed based on the cooling theory of coal gangue sintered material. In the process of the first cooling stage, rapid cooling through the dry cooling fan can effectively store the heat energy in the hot sintered material in the glass phase formed after rapid cooling, improve its activity, and improve the performance of coal gangue-based cementitious materials. After quick cooling at high temperatures, the second stage can be chilled at room temperature to avoid the ongoing use of high air volume and low air temperature cooling, which can effectively minimize the cooling process's energy consumption.

(3) The invention provides the method for preparing cementing material by sintering activation of coal gangue and invents a multifunctional composite additive. The multifunctional composite additive serves a variety of purposes, including enhancing spheroidization, catalyzing the combustion of fixed carbon and raising the oxygen position of the material layer. These functions improve the sintering utilization coefficient, lower residual carbon levels in the coal gangue sintering material, and increase the activity of the coal gangue sintering mixture. The performance of next cementitious materials will be improved.

(4) The invention provides the method for preparing cementing material by sintering activation of coal gangue. Utilize composite additives to their full potential in order to boost the thermal activation impact of coal gangue, the activity of coal gangue mixture, and the percentage of coal gangue active mixture in cementitious material (55%-75%). This will reinforce the synergy of sintering and shaft furnace segmental cooling. At the same time, by combining highly active coal gangue with a small amount of easily accessible, inexpensive quicklime and gypsum, it is possible to create superior performance cementitious materials that can be used in a variety of construction settings, including mine backfill, land solidification, pavement repair, and other fields. This allows for the use of coal gangue in high-volume, environmentally friendly, and highly profitable processes.

BRIEF DESCRIPTION OF THE DRAWINGS

In FIG. 2, 1—shaft furnace body; 2—storage tank; 3—vibrating feeder; 4—trough; 5—baffle; 6—center hood; 7—air outlet; 8—fan; 9—cold air pipe; 10—inlet regulating valve; 11—inverted cone; 12—disc discharger; 13—belt; 14—exhaust port.

DETAILED DESCRIPTION OF THE EMBODIMENTS

Figure 1:
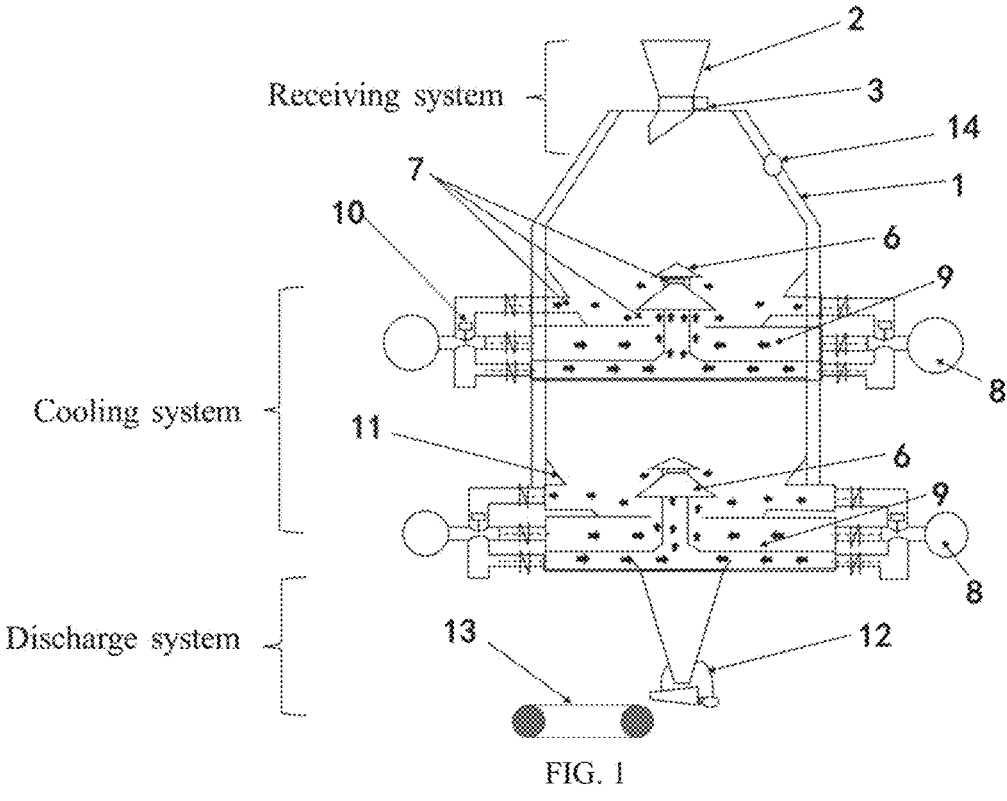
FIG. 1 is a schematic diagram of the structure of the shaft furnace cooling device.

The technical solution of the present invention is elaborated below by specific embodiments.

The following embodiments use coal gangue of a certain region, and its chemical composition is as follows:

Fe 2.33%, $SiO_2$ 54.33%, CaO 2.14%, MgO 0.88%, $Al_2O_3$ 24.76%, FC 3.34%, $Na_2O$ 0.72%, $K_2O$ 1.33%.

Composition of quicklime: CaO 82.3%, $SiO_2$ 3.56%, MgO 1.14%, $Al_2O_3$ 2.46%.

Composition of fly ash: CaO 33%, $SiO_2$ 35%, $Al_2O_3$ 24%, MgO 4%.

Composition of gypsum: $CaSO_4$ 92.34%.

Example 1

The invention relates to a method for preparing a cementing material by sintering and activating coal gangue, which comprises the following steps:

Pretreatment of coal gangue: the coal gangue is crushed to −15 mm by jaw and then to 8 mm by double-roller crusher. Finally, the coal gangue is crushed to 6.3 mm (72%) and −0.5 mm (21%) by a high-pressure roller mill. Among them, the pressure of the high-pressure roller mill is 5.0 MPa.

(2) batch 5 min, mixing and granulating: adding 6.0% water and 0.9% composite additives (20% manganese dioxide, 35% potassium perchlorate and 45% sodium humate) to the crushed coal gangue powder, and then vigorously mixing for 5 min in a powerful mixer with the rotating speed of 2000 rpm. The mixed ore belt was transported to the drum granulator. During the granulation process, water with a mass ratio of 1.5% was sprayed, the rotation speed of the drum granulator was 45 rpm, and the granulation time was 3 min. The pellets obtained by granulation had a water content of 7.2%, and the air permeability resistance of raw meal was 42 mm $H_2O$.

(3) Sintering activation: the raw coal gangue is distributed by rollers in a belt sintering machine (the height of the material layer is 900 mm) and then ignited, exhausted, sintered and cooled, with 15-20 mm coal gangue as a bedding material with a thickness of 20 mm, ignition time of 2 min, the ignition temperature of 1100° C., ignition negative pressure of 5 KPa, heat preservation temperature of 900° C., heat preservation time of 5 min and heat preservation negative pressure of 5 KPa; Sintering negative pressure 1 3 KPa; The coal gangue sinter can be obtained.

(4) cooling: the hot coal gangue sinter is cooled vertically in a two-stage vertical cooling mode, and the first stage of cooling adopts a dry cooling blower with an air volume of 3100 $m^3$/t; In the second stage of cooling, a normal temperature blower is used, with an air volume of 1800 $m^3$/t, and the temperature of the sintered material after final cooling is lower than 50° C.

(5) Crushing and grinding: the coal gangue sintered material is crushed to −1 mm by a jaw crusher and then dried in a high-pressure roller mill and a ball mill until the specific surface area of the particle size is about 600 $m^2$/kg so that the coal gangue active admixture can be obtained.

(6) Compounding: finely ground coal gangue mixture, fly ash, quicklime and gypsum are mixed according to the proportion of 55%, 15%, 15% and 15%, and the stirring speed is 260 rpm; After stirring, transfer to the mold in three layers, each layer vibrates for the 40 s, cover the sample with PVC film, and dismantle the mold after 24 h. Transfer to curing box with curing temperature of 25° C. and humidity of 93%. The compressive strengths of the obtained cementitious materials at 3 days, 7 days and 28 days are 10.4 MPa, 18.7 MPa and 22.4 MPa, respectively.

Figure 2:
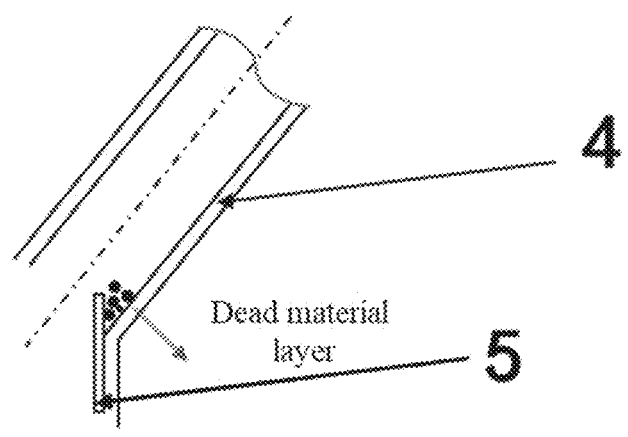
FIG. 2 is a schematic diagram of the structure of the vibrating feeder chute baffle.
Figure 3:
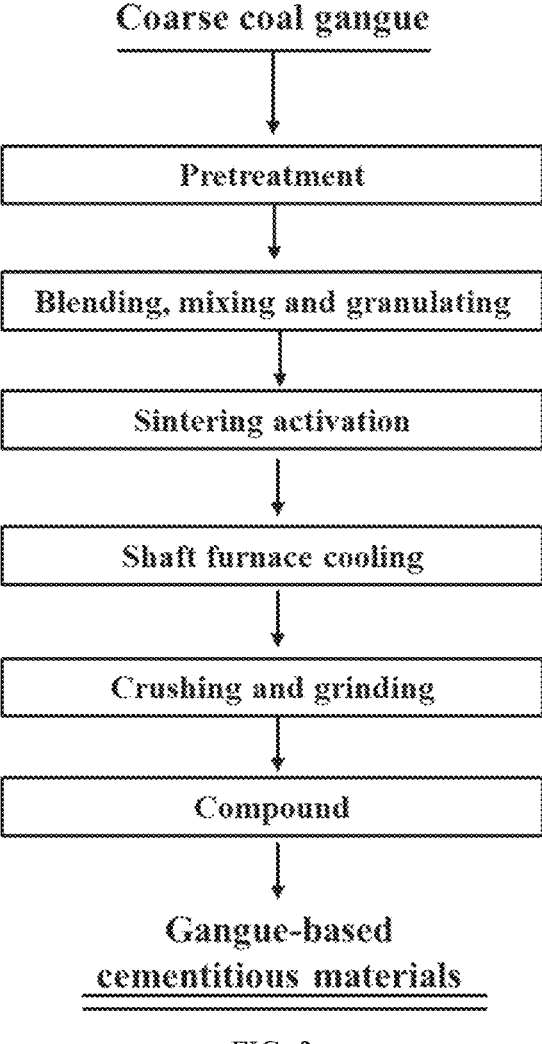
FIG. 3 is a process flow diagram of the method of the present invention.

As shown in FIGS. 1 to 2, the shaft furnace cooling device adopted in this embodiment includes a shaft furnace body 1, and the shaft furnace cooling device also includes a receiving system, a cooling system and a discharging system which are sequentially arranged from top to bottom;

The receiving system comprises a storage tank 2 and a vibrating feeder 3; The storage tank 2 is arranged above the vibrating feeder 3, and the storage tank 2 is used for receiving high-temperature coal gangue sinter; The bottom end of the vibrating feeder 3 is provided with a chute 4; The head end of the chute 4 is connected to the storage tank 2, and its tail end is communicated with the shaft furnace body 1; The end of the chute is provided with a baffle 5, which forms a dead material layer to protect the chute, and the height of the baffle 5 is 5 cm.

The cooling system adopts a step-by-step cooling mode, which includes a primary cooling unit and a secondary cooling unit, in turn, from top to bottom. The primary cooling unit comprises two groups of central hoods 6, which are arranged up and down along the height direction, and each group of central hoods 6 is provided with an air outlet 7;

The primary cooling unit also comprises two fans 8 symmetrically arranged on both sides of the shaft furnace body 1, and each fan 8 is connected to three cold air pipes 9, wherein the two cold air pipes 9 are connected to two groups of central hoods 6; Another cold air duct 9 is arranged on the side of the shaft furnace body 1, and the side of the shaft furnace body is provided with a corresponding air outlet 7.

In this embodiment, the central hood 6 and the cold branch pipe 9 are made of wear-resistant and heat-resistant materials, four groups of central hoods are arranged along the height direction, and each group of hood units is respectively provided with air outlets, and the central hoods are fixedly installed on the cold air duct.

In this embodiment, an air inlet regulating valve 10 is arranged at the joint of the fan and the three cold air pipes so that it is convenient to adjust the air supply volume of each cold air pipe 9 according to the feeding rate of the sintering material.

In this embodiment, an inverted cone 11 is arranged between the central hood and the shaft furnace body, which is convenient for the collection and cooling of coal gangue sintering materials.

In this embodiment, the structure of the secondary cooling unit is consistent with that of the primary cooling unit.

In this embodiment, the air supply system of the primary cooling unit is a dry-cooling blower, which performs the first-stage cooling of the coal gangue sintered material, rapidly cools and forms high-temperature waste gas; The air supply system of the secondary cooling unit is a normal temperature blower, which cools the coal gangue sinter for the second time to form low-temperature waste gas.

In this embodiment, the discharging system includes a disc discharger 12, which is arranged at the bottom of the shaft furnace body 1. The cooled coal gangue sinter is discharged through the disc discharger and transported to the next process by a belt 13.

In this embodiment, the lower part of shaft furnace body 1 is cylindrical, and the upper part is conical; The shell of the furnace body is welded by steel plate, and the lining of the furnace body is made of refractory material. The upper part of the shaft furnace body is provided with an exhaust port 14, which is connected to a dust collector through a pipeline.

Example 2

The invention relates to a method for preparing a cementing material by sintering and activating coal gangue, which comprises the following steps:

Pretreatment of coal gangue: the coal gangue is crushed to −15 mm by jaw and then to 8 mm by double-roller crusher. Finally, the coal gangue is crushed to 6.3 mm (72%) and −0.5 mm (21%) by a high-pressure roller mill. Among them, the pressure of the high-pressure roller mill is 5.0 MPa.

(2) batch 5 min, mixing and granulating: adding 6.0% water and 1.2% composite additives (20% manganese dioxide, 35% potassium perchlorate and 45% sodium humate) to the crushed coal gangue powder, and then vigorously mixing for 5 min in a powerful mixer with the rotating speed of 2000 rpm. The evenly mixed ore belt is transported to the drum granulator. During the granulation process, water with a mass ratio of 1.5% is sprayed, the rotation speed of the drum granulator is 45 rpm, and the granulation time is 3 min. The pellets obtained by granulation have a water content of 7.2%, and the air permeability resistance of raw meals is 40 mm $H_2O$.

(3) Sintering activation: the raw coal gangue is distributed by rollers in a belt sintering machine (the height of the material layer is 900 mm) and then ignited, exhausted, sintered and cooled, with 15-20 mm coal gangue as a bedding material with a thickness of 20 mm, ignition time of 2 min, the ignition temperature of 1100° C., ignition negative pressure of 5 KPa, heat preservation temperature of 900° C., heat preservation time of 5 min and heat preservation negative pressure of 5 KPa; Sintering negative pressure 13 KPa; The coal gangue sinter can be obtained.

(4) cooling: the hot coal gangue sinter is cooled vertically in a two-stage vertical cooling mode, and the first stage of cooling adopts a dry cooling blower with an air volume of 3100 $m^3$/t; In the second stage of cooling, a normal temperature blower is used, with an air volume of 1800 $m^3$/t, and the temperature of the sintered material after final cooling is lower than 50° C.

(5) Crushing and grinding: the coal gangue sintered material is crushed to −1 mm by a jaw crusher and then dried in a high-pressure roller mill and a ball mill until the specific surface area of the particle size is about 600 $m^2$/kg so that the coal gangue active admixture can be obtained.

(6) Compounding: finely ground coal gangue mixture, fly ash, quicklime and gypsum are mixed according to the proportion of 55%, 15%, 15% and 15%, and the stirring speed is 260 rPm; After stirring, transfer to the mold in three layers, each layer vibrates for the 40 s, cover the sample with PVC film, and dismantle the mold after 24 h. Transfer to curing box with curing temperature of 25° C. and humidity of 93%. The compressive strengths of the obtained cementitious materials at 3 days, 7 days and 28 days are 12.3 MPa, 19.9 MPa and 24.1 MPa, respectively.

Compared with Example 1, Example 2 shows that the strength of the prepared cementitious material is improved by increasing the dosage of the composite additive, which shows that the composite additive can improve the activity of the coal gangue sinter and further improve the properties of the cementitious material.

Example 3

The invention relates to a method for preparing a cementing material by sintering and activating coal gangue, which comprises the following steps:

Pretreatment of coal gangue: the coal gangue is crushed to −15 mm by jaw and then to 8 mm by double-roller crusher. Finally, the coal gangue is crushed to 6.3 mm (72%) and −0.5 mm (21%) by a high-pressure roller mill. Among them, the pressure of the high-pressure roller mill is 5.0 MPa.

(2) batch 5 min, mixing and granulating: adding 6.0% water and 1.5% composite additives (20% manganese dioxide, 35% potassium perchlorate and 45% sodium humate) to the crushed coal gangue powder, and then vigorously mixing for 5 min in a powerful mixer with the rotating speed of 2000 rpm. The mixed ore belt was transported to the drum granulator. During the granulation process, water with a mass ratio of 1.5% was sprayed, the rotation speed of the drum granulator was 45 rpm, and the granulation time was 3 min. The pellets obtained by granulation had a water content of 7.2%, and the air permeability resistance of raw meal was 38 mm $H_2O$.

(3) Sintering activation: the raw coal gangue is distributed by rollers in a belt sintering machine (the height of the material layer is 900 mm) and then ignited, exhausted, sintered and cooled, with 15-20 mm coal gangue as a bedding material with a thickness of 20 mm, ignition time of 2 min, the ignition temperature of 1100° C., ignition negative pressure of 5 KPa, heat preservation temperature of 900° C., heat preservation time of 5 min and heat preservation negative pressure of 5 KPa; Sintering negative pressure 13 KPa; The coal gangue sinter can be obtained.

(4) cooling: the hot coal gangue sinter is cooled vertically in a two-stage vertical cooling mode, and the first stage of cooling adopts a dry cooling blower with an air volume of 3100 $m^3$/t: In the second stage of cooling, a normal temperature blower is used, with an air volume of 1800 m³/t, and the temperature of the sintered material after final cooling is lower than 50° C.

(5) Crushing and grinding: the coal gangue sintered material is crushed to −1 mm by a jaw crusher and then dried in a high-pressure roller mill and a ball mill until the specific surface area of the particle size is about 600 m²/kg so that the coal gangue active admixture can be obtained.

(6) Compounding: finely ground coal gangue mixture, fly ash, quicklime and gypsum are mixed according to the proportion of 55%, 15%, 15% and 15%, and the stirring speed is 260 rpm; After stirring, transfer to the mold in three layers, each layer vibrates for the 40 s, cover the sample with PVC film, and dismantle the mold after 24 h. Transfer to curing box with curing temperature of 25° C. and humidity of 93%. The compressive strengths of the obtained cementitious materials at 3 days, 7 days and 28 days are 13.8 MPa, 21.6 MPa and 25.4 MPa, respectively.

Compared with Example 1-2, Example 3 further improved the strength of the prepared cementitious material after increasing the dosage of composite additives.

Example 4

The invention relates to a method for preparing a cementing material by sintering and activating coal gangue, which comprises the following steps:

Pretreatment of coal gangue: the coal gangue is crushed to −15 mm by jaw and then to 8 mm by double-roller crusher. Finally, the coal gangue is crushed to 6.3 mm (72%) and −0.5 mm (21%) by a high-pressure roller mill. Among them, the pressure of the high-pressure roller mill is 5.0 MPa.

(2) batch 5 min, mixing and granulating: adding 6.0% water and 1.5% composite additives (25% manganese dioxide, 30% potassium perchlorate and 45% sodium humate) to the crushed coal gangue powder, and then vigorously mixing for 5 min in a powerful mixer with the rotating speed of 2000 rpm. The mixed ore belt was transported to the drum granulator. During the granulation process, water with a mass ratio of 1.5% was sprayed, the rotation speed of the drum granulator was 45 rpm, and the granulation time was 3 min. The pellets obtained by granulation had a water content of 7.2%, and the air permeability resistance of raw meals was 398 mm H₂O.

(3) Sintering activation: the raw coal gangue is distributed by rollers in a belt sintering machine (the height of the material layer is 900 mm) and then ignited, exhausted, sintered and cooled, with 15-20 mm coal gangue as a bedding material with a thickness of 20 mm, ignition time of 2 min, the ignition temperature of 1100° C., ignition negative pressure of 5 KPa, heat preservation temperature of 900° C., heat preservation time of 5 min and heat preservation negative pressure of 5 KPa; Sintering negative pressure 13 KPa; The coal gangue sinter can be obtained.

(4) cooling: the hot coal gangue sinter is cooled vertically in a two-stage vertical cooling mode, and the first stage of cooling adopts a dry cooling blower with an air volume of 3,100 m³/t; In the second stage of cooling, a normal temperature blower is used, with an air volume of 1800 m³/t, and the temperature of the sintered material after final cooling is lower than 50° C.

(5) Crushing and grinding: the coal gangue sintered material is crushed to −1 mm by a jaw crusher and then dried in a high-pressure roller mill and a ball mill until the specific surface area of the particle size is about 600 m²/kg so that the coal gangue active admixture can be obtained.

(6) Compounding: finely ground coal gangue mixture, fly ash, quicklime and gypsum are mixed according to the proportion of 65%, 10%, 10% and 15%, and the stirring speed is 26 rpm; After stirring, transfer to the mold in three layers, each layer vibrates for the 40 s, cover the sample with PVC film, and dismantle the mold after 24 h. Transfer to curing box with curing temperature of 25° C. and humidity of 93%. The compressive strengths of the obtained cementitious materials at 3 days, 7 days and 28 days are 14.7 MPa, 22.3 MPa and 26.4 MPa, respectively.

Compared with Example 3, Example 4 shows that the strength of the prepared cementitious material is improved by increasing the amount of coal gangue active admixture.

Example 5

The invention relates to a method for preparing a cementing material by sintering and activating coal gangue, which comprises the following steps:

Pretreatment of coal gangue: the coal gangue is crushed to −15 mm by jaw and then to 8 mm by double-roller crusher. Finally, the coal gangue is crushed to 6.3 mm (72%) and −0.5 mm (21%) by a high-pressure roller mill. Among them, the pressure of the high-pressure roller mill is 5.0 MPa.

(2) batch 5 min, mixing and granulating: adding 6.0% water and 1.5% composite additives (25% manganese dioxide, 30% potassium perchlorate and 45% sodium humate) to the crushed coal gangue powder, and then vigorously mixing for 5 min in a powerful mixer with the rotating speed of 2000 rpm. The mixed ore belt was transported to the drum granulator. During the granulation process, water with a mass ratio of 1.5% was sprayed, the rotation speed of the drum granulator was 45 rpm, and the granulation time was 3 min. The pellets obtained by granulation had a water content of 7.2%, and the air permeability resistance of raw meals was 398 mm H₂O.

(3) Sintering activation: the raw coal gangue is distributed by rollers in a belt sintering machine (the height of the material layer is 900 mm) and then ignited, exhausted, sintered and cooled. The thickness of the bottom material is 20 mm, and the ignition time is 2 min. The ignition temperature is 1100° C., the ignition negative pressure is 5 KPa, the heat preservation temperature is 900° C., the heat preservation time is 5 min, and the heat preservation negative pressure is 5 KPa. The coal gangue sinter can be obtained.

(4) cooling: the hot coal gangue sinter is cooled vertically in a two-stage vertical cooling mode, and the first stage of cooling adopts a dry cooling blower with an air volume of 3100 m³/t; In the second stage of cooling, a normal temperature blower is used, with an air volume of 1800 m³/t, and the temperature of the sintered material after final cooling is lower than 50° C.

(5) Crushing and grinding: the coal gangue sintered material is crushed to −1 mm by a jaw crusher and then dried in a high-pressure roller mill and a ball mill until the specific surface area of the particle size is about 600 m²/kg so that the coal gangue active admixture can be obtained.

(6) Compounding: finely ground coal gangue mixture, fly ash, quicklime and gypsum are mixed according to the proportion of 75%, 10%, 10% and 5%, and the stirring speed is 260 rpm; After stirring, transfer to the mold in three layers, each layer vibrates for the 40 s, cover the sample with PVC film, and dismantle the mold after 24 h. Transfer to curing box with curing temperature of 25° C. and humidity of 93%. The compressive strengths of the obtained cementitious materials at 3 days, 7 days and 28 days are 17.2 MPa, 24.7 MPa and 28.3 MPa, respectively.

Compared with Example 3-4, Example 5 further improved the strength of the prepared cementitious material after increasing the amount of coal gangue active admixture.

Although embodiments of the present invention have been shown and described, it will be understood by those skilled in the art that various changes, modifications, substitutions and variations can be made to these embodiments without departing from the principles and spirit of the present invention, the scope of which is defined by the appended claims and their equivalents.

What is claimed is:

1. A method for preparing a cementitious material by a sintering activation of a coal gangue, comprising following steps:

(1) a pretreatment: crushing a coarse-grained coal gangue to a predetermined particle size to obtain a crushed coal gangue;

(2) batching, mixing and granulating: fully mixing the crushed coal gangue obtained in step (1), a composite additive, and water according to a set proportion to obtain a first resulting mixture and granulating the first resulting mixture to obtain granulated pellets;

(3) a sintering activation: distributing, igniting and exhausting the granulated pellets obtained in step (2) in a sintering machine for the sintering activation to obtain a decarburized coal gangue sinter;

(4) cooling: cooling the decarburized coal gangue sinter obtained in step (3) in a cooler to obtain a cooled coal gangue sinter;

(5) crushing and grinding: crushing and finely grinding the cooled coal gangue sinter obtained in step (4) to obtain a coal gangue active admixture;

(6) compounding: mixing the coal gangue active admixture obtained in step (5), a fly ash, a quicklime, and a gypsum according to a predetermined ratio to obtain a second resulting mixture, and then performing a mold injection, a mold removal, and a curing on the second resulting mixture to obtain a coal gangue-based cementitious material.

2. The method for preparing the cementitious material by the sintering activation of the coal gangue according to claim 1, wherein a fixed carbon content in the coarse-grained coal gangue of step (1) is 1.5%-5.5%.

3. The method for preparing the cementitious material by the sintering activation of the coal gangue according to claim 1, wherein in step (1), the coarse-grained coal gangue is crushed to 15 mm by a jaw crusher and then crushed to 8 mm by a roller crusher; subsequently, a high-pressure roller mill is configured for crushing until the crushed coal gangue with a particle size of 6.3 mm accounting for 65%-85% and the crushed coal gangue with a particle size of 0.5 mm accounting for 15%-25%; and a working pressure is 2.0-6.0 MPa in the crushing of the high-pressure roller mill.

4. The method for preparing the cementitious material by the sintering activation of the coal gangue according to claim 1, wherein in step (2), a granulation is carried out by using a cylinder granulator, and a rotating speed of the cylinder granulator is 30-60 rpm, a granulation time is 2-4 min; a water content sprayed in a granulation process is 1%-2%, and a water content of the granulated pellets obtained is controlled at 6.5%-7.5%.

5. The method for preparing the cementitious material by the sintering activation of the coal gangue according to claim 1, wherein a sintering method in step (3) is a belt sintering;

in a distribution process of the belt sintering, a height of a material layer is controlled to be 500-2000 mm; a thickness of a bedding material is controlled to be 15-25 mm, and the coal gangue with a particle size of 15-20 mm is configured as the bedding material;

in an ignition process of the belt sintering, an ignition time is 1-2 min; an ignition temperature is 1050-1150° C.; an ignition negative pressure is 4-6 KPa, a heat preservation temperature is 700-1000° C., a heat preservation time is 3-5 min, and a heat preservation negative pressure is 4-6 KPa; and in a sintering process of a belt draft, a sintering negative pressure is 10-18 KPa.

6. The method for preparing the cementitious material by the sintering activation of the coal gangue according to claim 1, wherein in step (4), a cooling method of the decarburized coal gangue sinter comprises one of a belt sintering machine cooling, an annular cooling, and a shaft furnace cooling.

7. The method for preparing the cementitious material by the sintering activation of the coal gangue according to claim 6, wherein a shaft furnace cooling device is adopted in a cooling process, and the shaft furnace cooling device comprises a shaft furnace body, and the shaft furnace cooling device further comprises a receiving system, a cooling system, and a discharging system sequentially arranged from a top to a bottom;

the receiving system comprises a storage tank and a vibrating feeder;

the storage tank is arranged above the vibrating feeder and configured for feeding from above the vibrating feeder, and a bottom end of the vibrating feeder is provided with a chute; a head end of the chute is connected to the storage tank, and a tail end of the chute is communicated with the shaft furnace body; and the tail end of the chute is provided with a baffle, and a height of the baffle is 3-8 cm.

8. The method for preparing the cementitious material by the sintering activation of the coal gangue according to claim 7, wherein the shaft furnace cooling device adopts a step-by-step cooling mode, and the shaft furnace cooling device sequentially comprises a primary cooling unit and a secondary cooling unit from a top to a bottom;

the primary cooling unit comprises two groups of central hoods, wherein the two groups of central hoods are arranged up and down along a height direction, and each of the two groups of central hoods is provided with an air outlet;

the primary cooling unit also comprises two fans symmetrically arranged on both sides of the shaft furnace body, each of the two fans is connected to three cold air pipes and an air inlet regulating valve is arranged at a joint of the two fans and the three cold air pipes;

wherein a first cold air pipe and a second cold air pipe of the three cold air pipes are connected to the two groups of central hoods; a third cold air pipe of the three cold air pipes is arranged on a side of the shaft furnace body, and the side of the shaft furnace body is provided with a corresponding air outlet;

a structure of the secondary cooling unit is consistent with a structure of the primary cooling unit; and an air supply system of the primary cooling unit is a dry-cooling blower with an air volume of 3,000-3,500 $m^3/t$, and the dry-cooling blower is configured to perform a first-stage cooling on the decarburized coal gangue sinter for rapidly cooling and forming a high-temperature waste gas; an air supply system of the secondary cooling unit is a normal temperature blower with an air volume of 1,500-2,000 $m^3/t$, and the normal temperature blower is configured to perform a second-stage cooling on the decarburized coal gangue sinter and form a low-temperature waste gas.

9. The method for preparing the cementitious material by the sintering activation of the coal gangue according to claim 1, wherein in step (5), the cooled coal gangue sinter is crushed to 3 mm by a toothed roller crusher, and then a specific surface area of a crushed coal gangue sinter is increased to 500-700 $m^2/kg$ by combining a high-pressure roller mill and a ball mill to obtain a coal gangue active mixture with a set fineness and specific surface area;

in step (6), in raw materials of the coal gangue-based cementitious material, mass percentages of the coal gangue active admixture, the fly ash, the quicklime, and the gypsum are 55%-75%, 10%-20%, and 5%-20%, respectively.

10. The method for preparing the cementitious material by the sintering activation of the coal gangue according to claim 2, wherein in step (1), the coarse-grained coal gangue is crushed to 15 mm by a jaw crusher and then crushed to 8 mm by a roller crusher; subsequently, a high-pressure roller mill is configured for crushing until the crushed coal gangue with a particle size of 6.3 mm accounting for 65%-85% and the crushed coal gangue with a particle size of 0.5 mm accounting for 15%-25%; and a working pressure is 2.0-6.0 MPa in the crushing of the high-pressure roller mill.

*     *     *     *     *